F. V. COOKE.
VEHICLE SPRING CONSTRUCTION.
APPLICATION FILED AUG. 26, 1920.
1,429,902. Patented Sept. 19, 1922.
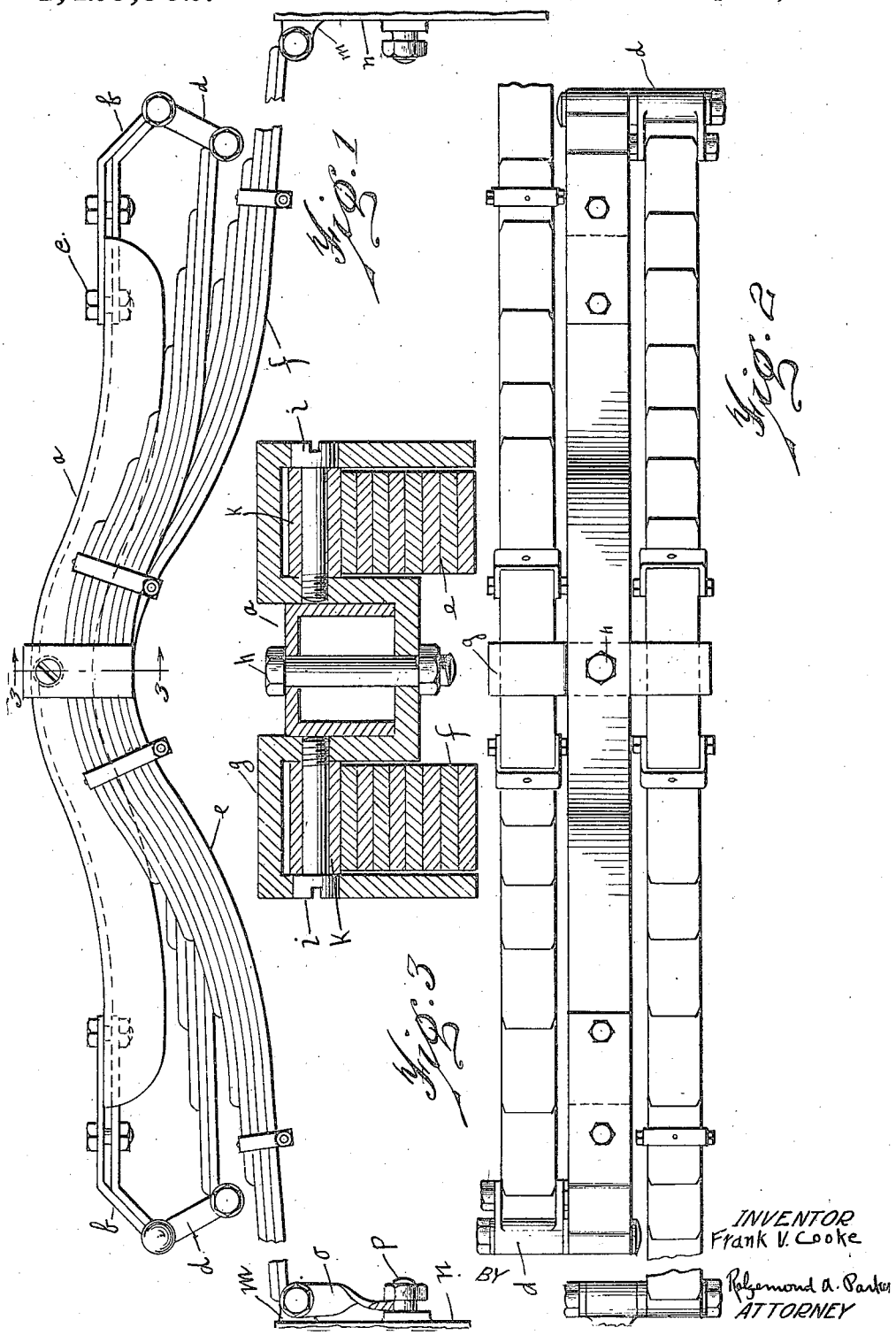
INVENTOR
Frank V. Cooke
BY Raymond A. Parker
ATTORNEY Patented Sept. 19, 1922.

1,429,902

UNITED STATES PATENT OFFICE.

FRANK V. COOKE, OF DETROIT, MICHIGAN, ASSIGNOR TO KARL B. GODDARD, OF DETROIT, MICHIGAN.

VEHICLE SPRING CONSTRUCTION.

Application filed August 26, 1920. Serial No. 406,139.

*To all whom it may concern:*

Be it known that I, FRANK V. COOKE, citizen of the United States, residing at Detroit, county of Wayne, State of Michigan, have invented a certain new and useful Improvement in Vehicle Spring Construction, and declare the following to be a full, clear, and exact description of the same, such as will enable others skilled in the art to which it pertains to make and use the same, reference being had to the accompanying drawings, which form a part of this specification.

My invention relates to improvements in vehicle spring construction. This invention is an improvement on and an adaptation of the principle of spring construction set forth in my Patent No. 1,344,792.

The spring construction here shown and claimed is particularly adapted for use as a rear spring on a Ford motor car. It is so constructed as to be attached to the standard Ford rear frame cross-member and the axle without any change or alteration of the parts mentioned. The spring-supporting means and the embracing yoke which affords a fulcrum support for the springs are particularly adapted for use in connection with this type of automobile construction.

In the drawings,—

Figure 1 is an elevation of my device attached to the rear cross member of a Ford chassis.

Fig. 2 is a plan of the device shown in Fig. 1.

Fig. 3 is a cross-section on the line 3—3 of Fig. 1.

Let $a$ indicate the rear cross-member of a Ford frame; this is a channel bar shaped as shown and provided with an aperture at each end through which a bolt is passed for securing the body to the rear cross frame member.

I provide a clip extension member $b$, one prong of which is adapted to be received in the channel of said frame member rigidly between the side flanges. The other prong of the clip lies adjacent the upper surface of the web portion of the frame member. The bolt $c$ is provided to secure such clip to the frame member. This bolt $c$ passes through the provided perforation previously referred to. This bolt is provided in a somewhat longer form than the regularly provided bolt so that it will hold the clip in place and also serve as a body bolt.

Each of said clip extensions $b$ is provided at its free end with a pivoted shackle $d$. These shackles, as provided, depend below the rear cross-member on opposite sides thereof as they are pivoted on opposite sides of the provided extensions.

To each of these shackles $d$ is pivoted one end of a spring. The opposite end of the spring is secured to the end of the axle furthest therefrom. The springs are indicated as $e$ and $f$. These springs as shown are slightly convex following the general outline of the rear frame member. The spring is pivoted to the bracket $m$ which is carried by the brake drum $n$. This bracket is regularly provided on Ford cars and in the ordinary type of construction a depending shackle is provided pivoted thereto, to which shackle is pivoted the end of the Ford rear cross spring. I do not provide a shackle but provide a longer bolt carried by the bracket upon which I pivot the spring. For one of the springs I provide a brace member $o$ fastened at one end to the bolt carried by the bracket, which brace is supported by the projecting end of the housing bolt $p$. The other spring, the outer end of which is pivoted on the opposite side of the bracket carried by the opposite brake drum, is provided with a supporting member which is braced from the radius rod. This construction is not shown in the drawing.

I provide a forked member $g$ adapted to be secured to the rear cross member of the frame intermediate its ends. This forked member is bent so as to provide a channel mid-way its ends and between its opposite depending forks, within which channel the rear frame member is adapted to be seated, as shown in Fig. 3. This channel, or midway recess in the forked member is so formed as to rigidly embrace the frame member $a$ and the bolt $h$ is adapted to secure such forked member to such frame.

The opposite ends of this forked member are so bent as to form a U-shaped socket on each side of the frame member. Each socket or fork is adapted to receive a spring as shown in Fig. 3. The springs are so received within these forks or sockets as to permit of their free longitudinal movement while the lateral sway of the springs therein is prevented. A roller-bearing $k$ mounted on a pin $i$ is carried by each of these forks and forms an upper fulcrum support for the spring.

What I claim is:

1. In a motor vehicle, in combination, with a frame member, an axle, a spring pivoted to one end of the frame member and to the opposite end of the axle, a second spring pivoted to the other end of the frame member and to the end of the axle farther therefrom, a fulcrum member adapted to embrace the intermediate portion of said frame member and provided with means for being secured thereto, said fulcrum member comprising a pair of U-shaped sockets each of which is adapted to receive a spring so as to permit movement of said spring longitudinally therein.

2. In a vehicle, in combination with a frame member, an axle, a pair of crossed springs, each of said springs secured at one end to the axle and at the other end to the end of the frame member furthest therefrom, a forked member bent so as to form a recess midway its ends adapted to receive said frame member, and provided with means for being secured rigidly thereto, said forked member provided on each side of said frame member with a depending fork adapted to receive a spring so as to permit longitudinal movement of the spring therethrough.

3. In a vehicle, in combination with a frame member, an axle, a pair of crossed springs, each of said springs secured at one end to the axle and at the other end to the end of the frame member furthest therefrom, a forked member bent so as to form a recess midway its ends adapted to receive said frame member, and provided with means for being secured rigidly thereto, said forked member provided on each side of said frame member with a depending fork adapted to receive a spring so as to permit longitudinal movement of the spring therethrough, a roller bearing mounted in each of said forks and adapted to serve as an upper fulcrum support for said springs.

4. In a motor vehicle, a vehicle frame member, an axle, a spring pivoted to one end of the frame member and the end of the axle furthest therefrom, a second spring pivoted to the other end of the frame member, and the opposite end of the axle, a forked member bent at its middle portion to form a U within which the frame member is adapted to be received, means for securing such frame member rigidly therein, the opposite ends of said forked member turned down to form a U on each side of said central U open at the bottom, each side U adapted to partially embrace a spring so as to restrain lateral movement thereof.

5. In a motor vehicle, a frame member, an axle, an extension adapted to be secured to each end of said frame member, a spring pivoted to the free end of each of said extensions and secured at its opposite end to the end of the axle furthest therefrom, said springs crossing each other intermediate the axle and frame member, body supporting means carried by said frame member in such a manner as to bear on said springs so the body load will be carried thereby, said body supporting means adapted to serve as a fulcrum for each of said springs while permitting free longitudinal movement of said springs relative thereto.

6. In a motor vehicle, an axle, a channel-frame member, an extension adapted to be secured at each end thereof, a shackle depending from the free end of each of said extensions, a spring pivoted at one end to one shackle and secured at its opposite end to the end of the axle furthest therefrom, a second spring pivoted at one end to the other shackle and secured at its opposite end to the end of the axle furthest therefrom, body supporting means adapted to partially embrace said frame member and rigidly secured thereto, said body supporting means adapted to bear on said springs at their crossing points in such a manner that the body load will be carried thereby while permitting free longitudinal movement of the springs relative thereof.

7. In a motor vehicle, an axle, a channel bar frame member, a forked clip adapted to be secured as an extension at each end of said frame member, one prong of said clip adapted to be received between the side flanges of said channel frame member, the other prong being adjacent the opposite side of the web of said channel frame, means for securing said extension rigidly to said frame member, a spring pivoted to one of said extensions and secured at its opposite end to the end of the axle furthest therefrom, a second spring pivoted to the other of said extensions and secured at its opposite end to the other end of the axle, a body supporting member fixed to said frame member and adapted to bear on said springs in such a manner as to form a fulcrum bearing therefor while permitting longitudinal movement of the springs relative thereof.

8. In a motor vehicle, an axle, a channel bar frame member, a forked clip adapted to be secured as an extension at each end of said frame member, the prongs of said clip so separated as to receive therebetween the web portion of said frame member, means passing through said web and clip to rigidly secure said frame and extension members together, a spring pivoted to each of said extensions and at the opposite end to the further end of the axle, a fulcrum member adapted to embrace said frame member and rigidly secured thereto, said fulcrum member adapted to bear on the upper surface of said springs in such a manner that the body load will be carried thereby while permitting longitudinal movement of the springs relative thereof.

9. In a motor vehicle, in combination with an axle, a channel bar frame member, a forked clip adapted to serve as an extension for said frame member, one prong of said clip adapted to be received within the channel of said frame rigidly between the side flanges, the other prong being adjacent the opposite side of the web of said channel frame, means passing through the prongs of said clip and the web of the frame securing them rigidly together, a forked member bent so as to form a central U within which the frame member is adapted to seat, means for rigidly securing said forked member to such frame intermediate its ends, opposite ends of said forked member turned downwardly to form a depending fork on each side of said frame within which a spring is adapted to be received for free longitudinal movement, each of said forks provided with a fulcrum bearing adapted to bear on the upper surface of said springs.

10. In a motor vehicle, a frame member, an axle, extensions adapted to be secured to each end of said frame member, each of said extensions provided with a depending shackle pivoted to its free end, springs pivoted at one end to said shackles crossing each other between the frame member and the axle and pivoted at their opposite ends to the ends of the axle, body supporting means rigidly secured to said frame member and provided with transversely extending roller bearings adapted to bear on each of said springs so the body load will be carried thereby while permitting free longitudinal movement of the springs relative said means.

11. In a motor vehicle, a frame member, an axle, a spring pivoted to one end of the axle and the further end of the frame member, a second spring pivoted to the opposite end of the axle and the opposite end of the frame member, body supporting means depending from the body in such a manner as to bear on the springs intermediate their ends, said body supporting means having roller bearings adapted to bear on each spring so the body load will be carried thereby while permitting free longitudinal movement of each spring relative said means.

12. In a motor vehicle, a frame member, a shackle secured to each end thereof, an axle normally parallel thereto, a pair of crossed springs each pivoted to said shackles crossing each other between the axle and frame member and pivoted at their opposite ends to the ends of the axle, a body supporting member rigidly secured to said frame member and having roller bearings adapted to bear on said springs at their crossing points forming fulcrum therefor which permit free longitudinal movement of each spring.

In testimony whereof, I sign this specification.

FRANK V. COOKE.